(12) United States Patent
Spadafora

(10) Patent No.: US 7,896,193 B1
(45) Date of Patent: Mar. 1, 2011

(54) BONUS CREDIT SYSTEM FOR MONEY-OPERATED MACHINES

(76) Inventor: Michael Spadafora, Reading, PA (US)

( * ) Notice: Subject to any disclaimer, the term of this patent is extended or adjusted under 35 U.S.C. 154(b) by 760 days.

(21) Appl. No.: 11/271,305

(22) Filed: Nov. 10, 2005

Related U.S. Application Data

(60) Provisional application No. 60/658,673, filed on Mar. 4, 2005.

(51) Int. Cl.
 B65H 3/00 (2006.01)
 G01N 9/04 (2006.01)
(52) U.S. Cl. .................... 221/155; 463/16; 463/20; 194/220; 250/223 R
(58) Field of Classification Search ............ 463/25, 463/16, 20; 221/155; 194/220; 250/232 R
See application file for complete search history.

(56) References Cited

U.S. PATENT DOCUMENTS

| | | | |
|---|---|---|---|
| 2,364,939 A | 12/1944 | Benjamin | 194/55 |
| 3,266,610 A | 8/1966 | Stahl | 194/1 |
| 3,292,759 A | 12/1966 | Meixner | 194/15 |
| 3,945,531 A | 3/1976 | Clairmonte | 222/27 |
| 4,013,157 A | 3/1977 | Britz | 194/1 N |
| 4,213,524 A | 7/1980 | Miyushita | 194/2 |
| 4,258,838 A | 3/1981 | Rockola | 194/1 R |
| 5,551,692 A | 9/1996 | Pettit | 273/143 R |
| 5,788,115 A | 8/1998 | Halliburton | 221/155 |
| 6,645,073 B2 | 11/2003 | Lemay | 463/20 |
| 2003/0157979 A1 | 8/2003 | Cannon | 463/16 |

Primary Examiner—John M Hotaling, II
Assistant Examiner—Masud Ahmed
(74) Attorney, Agent, or Firm—Miller Law Group, PLLC

(57) ABSTRACT

An electronic apparatus can be placed between the money acceptor and the operative components of a gaming or vending machine to award a bonus based on predetermined utilization rates of the machine. The apparatus may incorporate dip switches to permit the number of bonuses to be varied and to change the frequency at which the bonuses are awarded. In gaming machines the bonus can be in the form of additional credits or increased play, while in vending machines the bonus can be in the form of additional credits or the dispensing of bonus product with the product purchased from the machine. Alternatively, the bonus award system can be incorporated into the money acceptor. In vending machines, a sensor may be incorporated to sense the dispensing of product from the vending machine to ascertain the utilization rate of the machine for the awarding of bonuses.

17 Claims, 5 Drawing Sheets

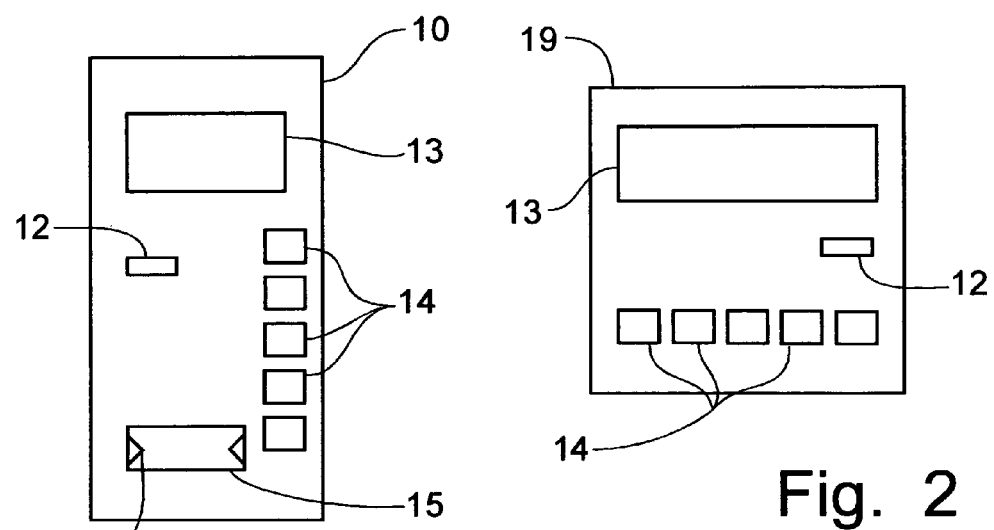
Fig. 1
Fig. 2
Fig. 3

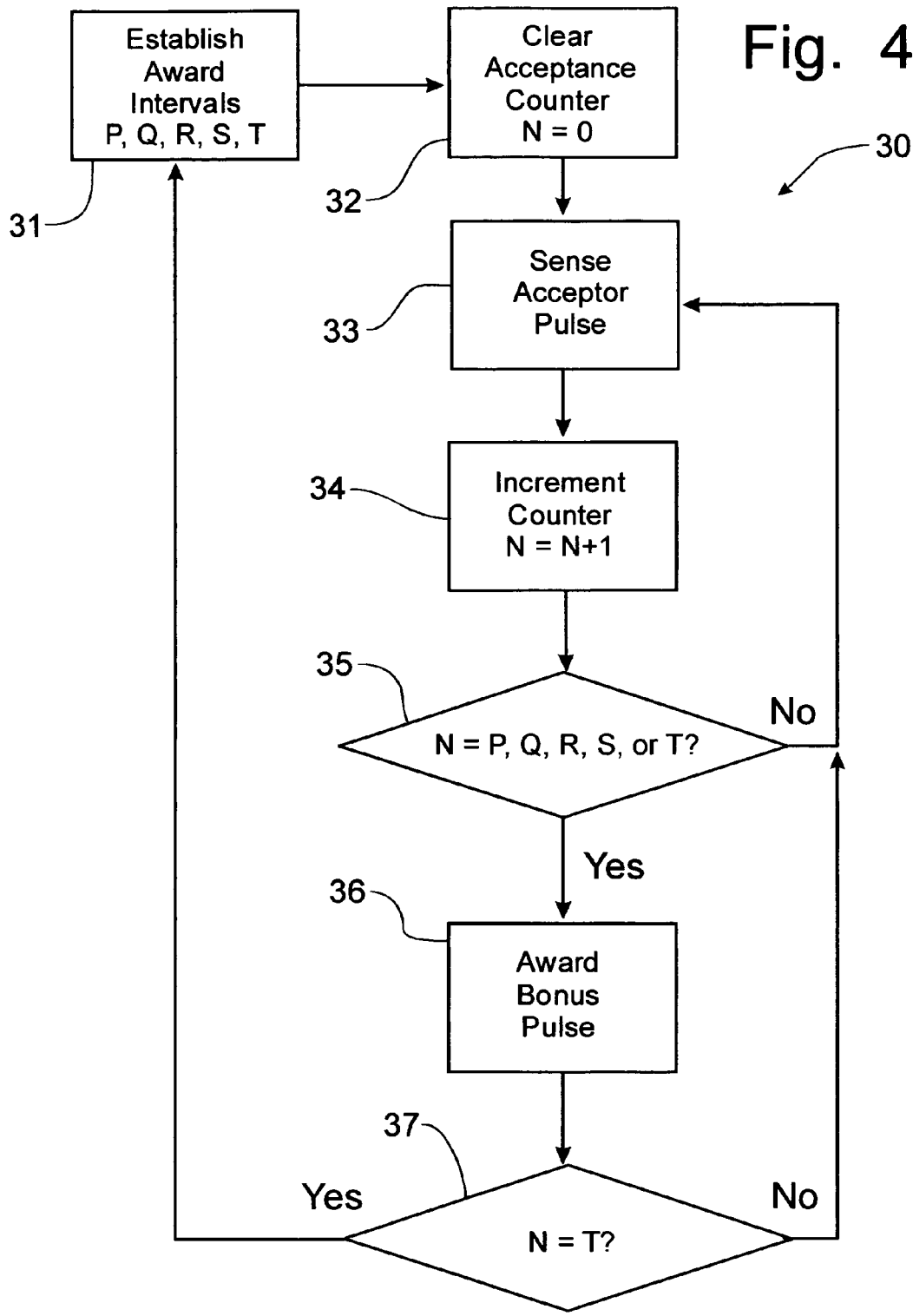

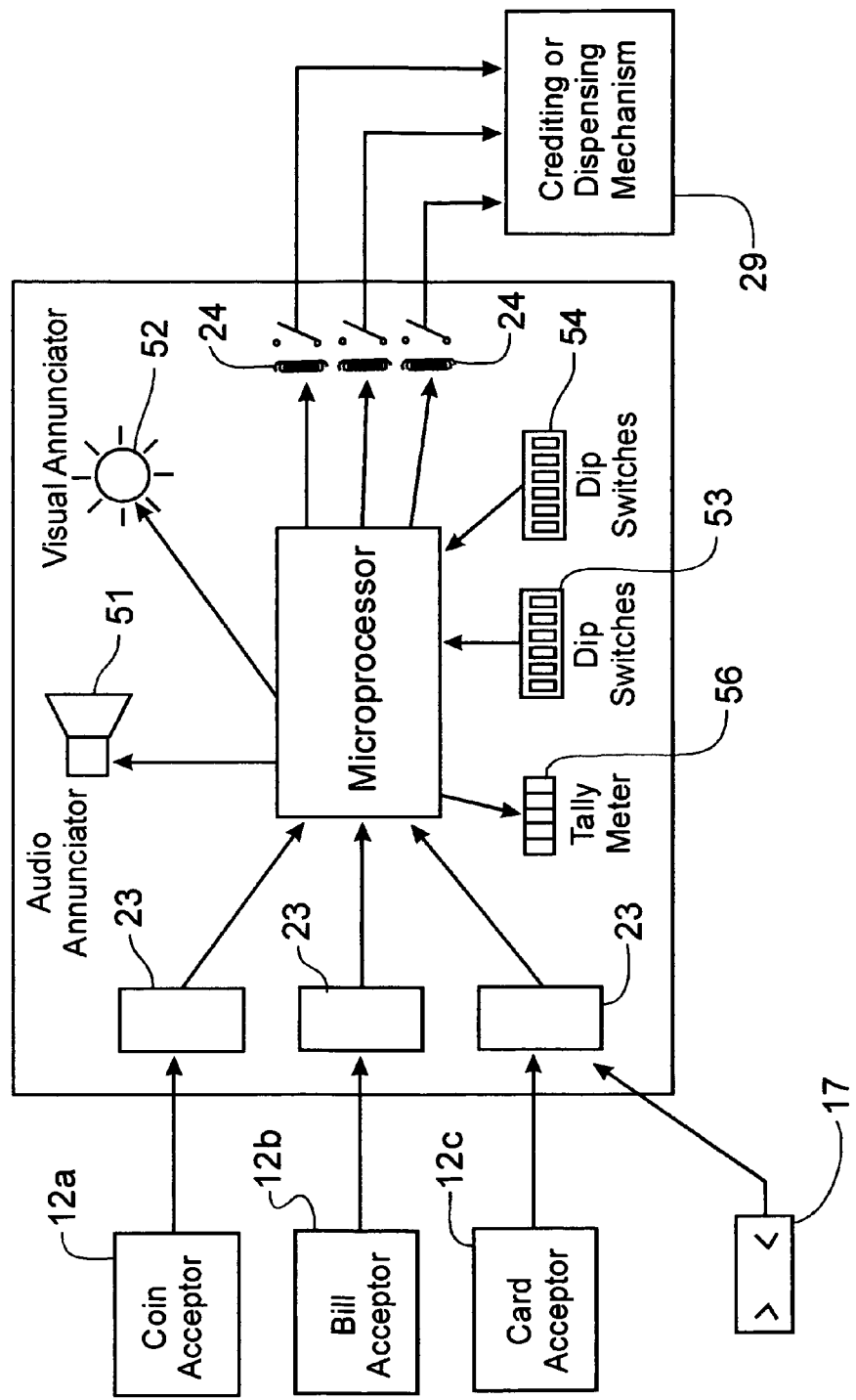

| Fig. 6A |
| Fig. 6B |

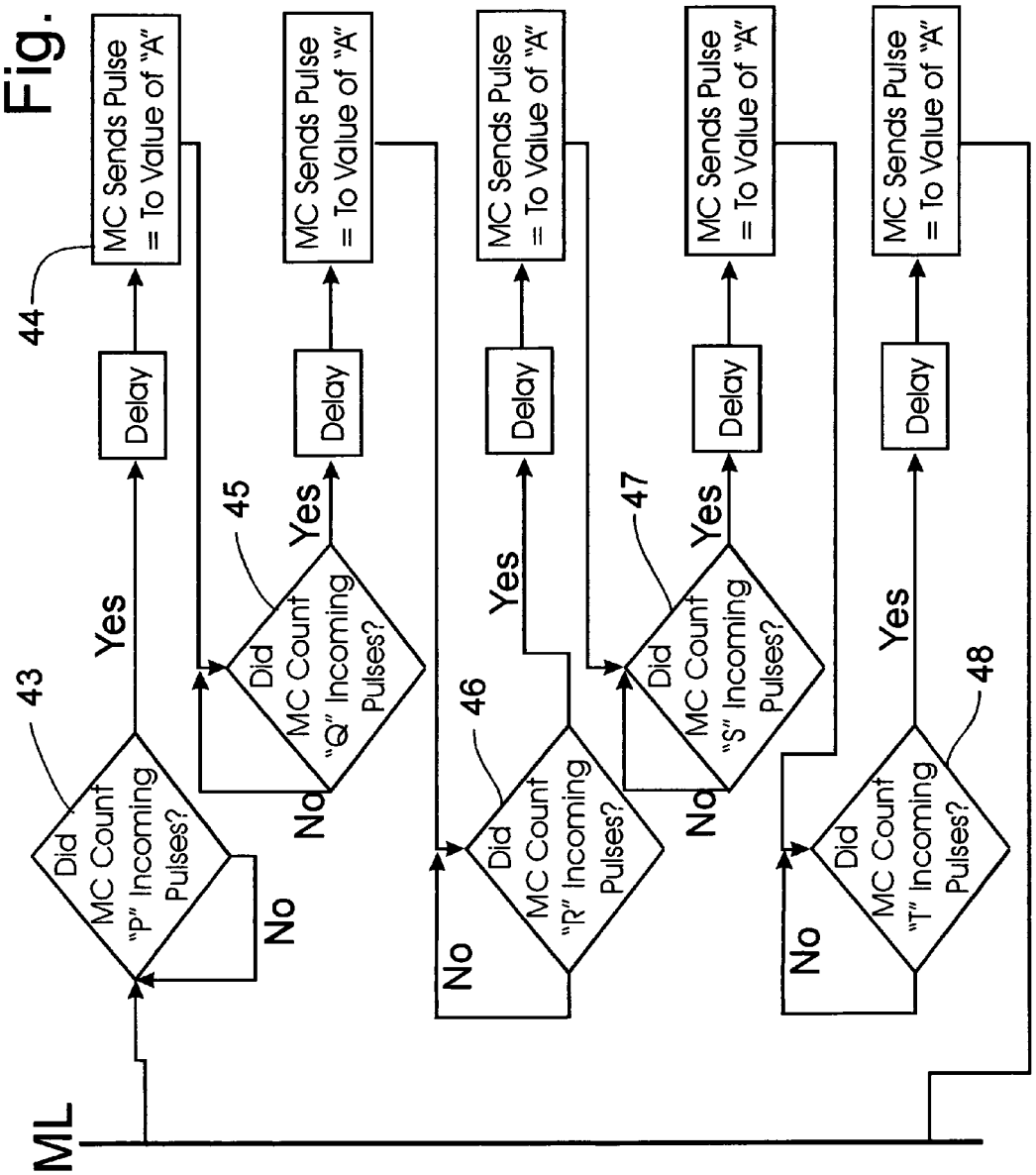

BONUS CREDIT SYSTEM FOR MONEY-OPERATED MACHINES

CROSS-REFERENCE TO RELATED APPLICATIONS

This application claims domestic priority on U.S. Provisional Patent Application Ser. No. 60/658,673, filed on Mar. 4, 2005, the contents of which are incorporated herein by reference.

BACKGROUND OF THE INVENTION

The present invention relates generally to a device to issue periodic bonus credits for vending and gaming machines to enhance interest in the use of the machines, and, more specifically, to an electronic device that will sense the utilization of the vending or gaming machine and provide predetermined bonus credits in response to the frequency of utilization.

Money-operated gaming and vending machines provide a predetermined profit from the use of the machine as a function of the utilization of the machine. For a gaming machine, the more money that is inserted into the machine to purchase play opportunities for the player of the machine, the greater the volume of profits will be for that machine. Similarly, the more items that are dispensed from a particular vending machine, the greater the volume of profit will be for the owner of that vending machine. Accordingly, utilization of the money-operated machine is a significant factor in the profitability of the machine.

In U.S. Pat. No. 2,364,939, issued to Harry S. Benjamin on Dec. 12, 1944, a mechanical apparatus would provide random free service for the use of a coin-operated machine. Electrical circuitry provides a random free play for a gaming machine in U.S. Pat. No. 3,266,610, issued to Allan E. Stahl on Aug. 16, 1966. Similarly, an electrical circuit provides a bonus award for vending machines in U.S. Pat. No. 3,292,759, issued to Edwin J. Meixner, et al on Dec. 20, 1966. A random lottery bonus is generated for a vending machine in U.S. Pat. No. 4,213,524, issued to Toshio Miyashita on Jul. 22, 1980.

Providing a bonus or a premium in conjunction with the dispensing of a predetermined amount of petrol is provided in the apparatus disclosed in U.S. Pat. No. 3,945,531, issued to Edward H. Clairemonte on Mar. 23, 1976. The bonus play mechanism in U.S. Pat. No. 4,013,157, issued to John A. Britz on Mar. 22, 1977, provides for bonus plays on a music machine when multiple coins are inserted at the time of selection, such as providing one play for a quarter and three plays for two quarters. Random generation of bonuses for a music playing machine is provided in U.S. Pat. No. 4,258,838, issued to Donald C. Rockola, et al on Mar. 31, 1981.

Electronic devices that provide a predetermined number of wins corresponding to a predetermined number of plays on a gaming machine, i.e. providing win/loss percentages that define the profit percentage of the machine, is taught in U.S. Pat. No. 5,551,692, issued to Donald W. Pettit on Sep. 3, 1996. In U.S. Pat. No. 5,788,115, issued to Ronald D. Halliburton on Aug. 4, 1998, a gaming machine having random diverters arranged to engage an article along a path of travel dispenses a bonus award if the article completes the path of travel without being diverted. A specifically operable bonusing apparatus is provided in a gaming machine disclosed in U.S. Pat. No. 6,645,073, issued to Steven C. Lemay, et al on Nov. 11, 2003. In U.S. Patent Application Publication No. 2003/0157979, filed by Lee E. Connon, et al and published on Aug. 21, 2003, a bonus award system is built into the operation of the machine and generates a random award of a bonus in conjunction with the winning operation of the machine.

Accordingly, it would be desirable to provide a system or device that would increase utilization of money-operated vending or gaming machines by providing a bonus award system that is directly associated with the utilization of the machine.

SUMMARY OF THE INVENTION

It is an object of this invention to award periodic bonus credits for vending and gaming machines in response to utilization levels of the machine.

It is another object of this invention that an in-line electronic device incorporating the principles of the instant invention can be add to existing gaming and vending machines to provide periodic bonus credits for the machine.

It is a feature of this invention that the award of bonus credits increases the utilization of the machine on which the system is installed.

It is an advantage of this invention that the increased utilization of the vending or gaming machine increases the volume of profits obtained from the machine.

It is another advantage of this invention that the frequency of the award of bonus credits can be selectively varied.

It is another feature of this invention that the bonus plan device can be utilized in vending machines to award bonus product to be dispensed with the purchased product from the vending machine.

It is still another feature of this invention that the bonus play apparatus is constructed with dip switches to change the frequency at which bonus credit is dispensed.

It is still another feature of this invention that the bonus play apparatus will issue periodic bonus credits for the play of the gaming machine on which the apparatus is installed.

It is still another feature of this invention that the bonus play apparatus will award periodic bonus product with the dispensing of product from a vending machine on which the apparatus is installed.

It is yet another feature of this invention that the number of bonus credits or bonus product to be periodically awarded can be varied, as well as the frequency at which the bonus is awarded.

It is a further feature of this invention that the an audible and/or visible reinforcement annunciator can be utilized to announce the awarding of a bonus from the apparatus.

It is still a further feature of this invention that the bonus award system can be incorporated into the bill acceptor of a gaming or vending machine.

It is yet a further feature of this invention that bonus award system can be packaged into a separate apparatus that can be retrofitted into existing gaming or vending machines to convert the machine from a standard gaming or vending machine to a machine that encourages utilization by awarding bonuses for the use of the machine.

It is a further advantage of this invention that the periodic cycling of the bonus awards is established on an irregular basis to minimize the ability of the operator or player of the machine to anticipate the granting of the bonus award.

It is still another feature of this invention that the use of the bonus play system on a vending machine may incorporate a sensor to establish the utilization rate of the vending machine for the awarding of bonus product.

It is yet another feature of this invention that the bonus play apparatus can be placed between the money acceptor and the crediting or the vending section of the vending or gaming machine.

It is yet another object of this invention to provide a bonus credit award apparatus or system for use in a vending or gaming machine, which is durable in construction, inexpensive of manufacture, carefree of maintenance, facile in assemblage, and simple and effective in use.

These and other objects, features and advantages are accomplished according to the instant invention by providing an electronic apparatus that can be placed between the money acceptor and the operative components of a gaming or vending machine to award a bonus based on predetermined utilization rates of the machine. The apparatus may incorporate dip switches to permit the number of bonuses to be varied and to change the frequency at which the bonuses are awarded. In gaming machines the bonus can be in the form of additional credits or increased play, while in vending machines the bonus can be in the form of additional credits or the dispensing of bonus product with the product purchased from the machine. Alternatively, the bonus award system can be incorporated into the money acceptor. In vending machines, a sensor may be incorporated to sense the dispensing of product from the vending machine to ascertain the utilization rate of the machine for the awarding of bonuses.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is a schematic elevational depiction of a vending machine into which a bonus award system incorporating the principles of the instant invention can be placed;

FIG. 2 is a schematic elevational depiction of a gaming machine into which a bonus award system incorporating the principles of the instant invention can be placed;

FIG. 3 is a schematic diagram of the installation of one embodiment of the bonus award system incorporating the principles of the instant invention;

FIG. 4 is a logic flow diagram of one embodiment of the bonus award system;

FIG. 5 is a schematic block diagram of a bonus award system for use in a gaming machine;

FIG. 6 is a diagram depicting how FIGS. 6A and 6B are arranged to provide a logic flow diagram of another embodiment of the instant invention;

FIG. 6A is a first portion of the logic flow diagram reflected in FIG. 6; and

FIG. 6B is a second portion of the logic flow diagram reflected in FIG. 6.

DETAILED DESCRIPTION OF THE PREFERRED EMBODIMENT

Figures 6, 6A:
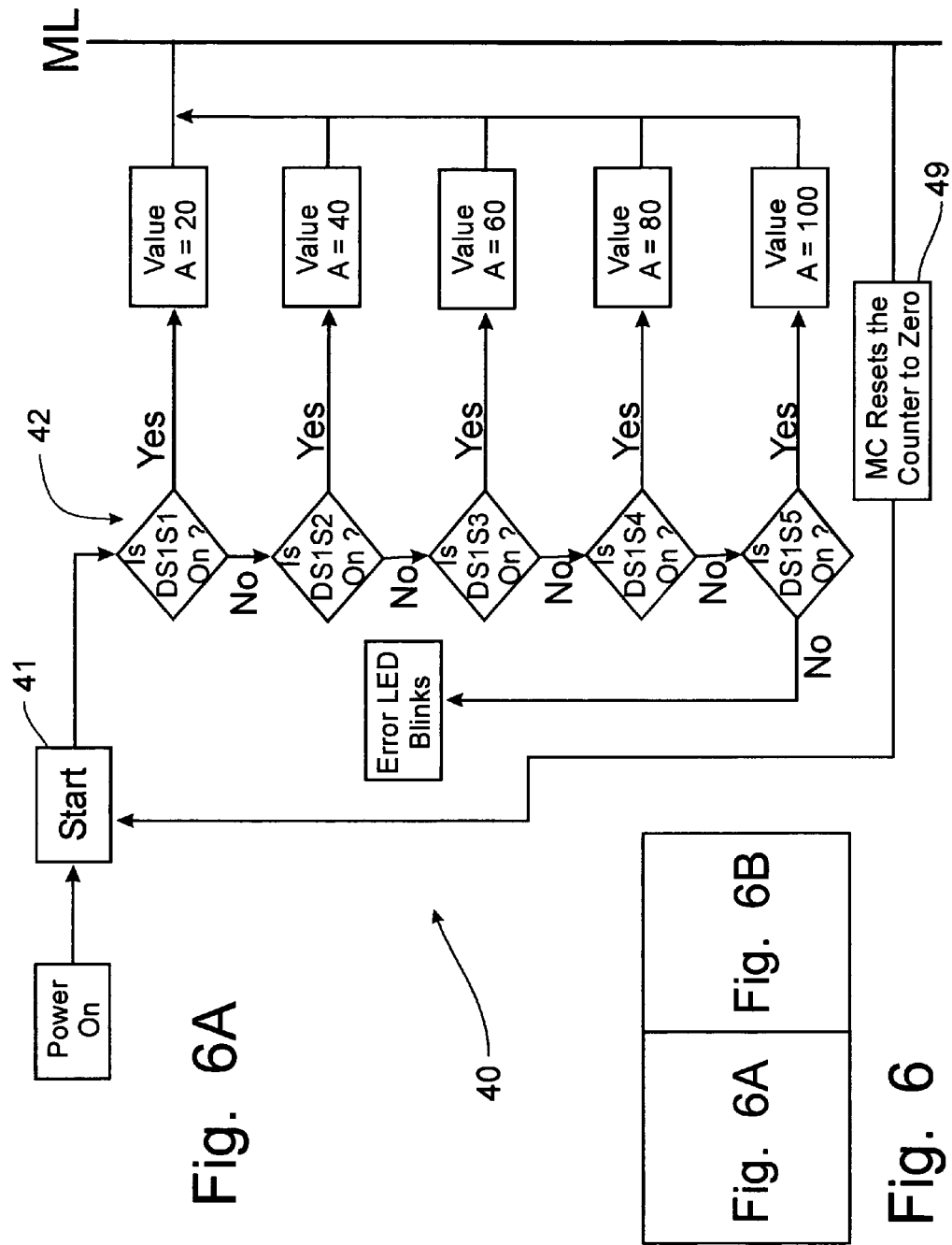

Referring now to FIGS. 1-5, a bonus award system incorporating the principles of the instant invention for use in conjunction with money-operated vending and/or gaming machines 10, 19 can best be seen. The preferred embodiment of the bonus award system is a free-standing apparatus 20 that can be operatively placed between the money acceptor 12 and the operative components of the machine.10, 19. The money acceptor 12 is an electronic device that receives money, either mechanically or electronically from an operator. The money acceptor 12 can be a device that accepts coins, bills, credit cards, debit cards smart cards, tickets tokens and any other known manner of transferring a monetary value into the machine 10, 19 for operation thereof.

It is known that the awarding of periodic bonuses for the use of a machine 10, 19 increases the utilization rate of that machine as compared to a similarly placed machine that does not award such bonuses. Bonuses or bonus awards can be in the form of bonus credits, increased playing time, the dispensing of bonus product, or monetary credit. The utilization rate of the machine 10, 19 can be defined as the number of credits that are paid by the operator or the number of products that have been dispensed. In one form of the instant invention, as is best seen in FIGS. 1-5, the bonus award apparatus 20 is a discrete electronic apparatus that counts the number of electrical pulses emitted by the money acceptor 12 and awards a bonus when the accumulated number of pulses reaches a predetermined threshold. When that threshold is attained, the bonus is awarded without additional input of money into the machine 10, 19, causing the operator to receive more credits or product than would otherwise correspond to the amount of money inserted into the machine 10, 19.

The bonus award apparatus 10 can be utilized in a vending machine 10, such as is schematically depicted in FIG. 1, or in a gaming machine 19, as is schematically depicted in FIG. 2. For either machine 10, 19, the money acceptor 12 is prominently located on the front of the machine 10, 19 for the operator to insert some form of financial payment into the machine 10, 19 to effect operation thereof in a normal manner. Both of the vending machine 10 and the gaming machine 19 would typically include a display or advertising panel 13 and buttons or other appropriate devices 14 for manipulating the control of the machine 10, 19 in a normal and conventional manner. The vending machine 10 will also typically have a product dispensing bin 15 to provide access to the product or products being dispensed from the vending machine 10. While a soda vending machine 10 and a poker machine 19 are schematically depicted in FIGS. 1 and 2, the bonus award system 20 can be utilized on many forms of vending and gaming machines, wherever enhanced use of the machine 10, 19 is desired.

In the way of examples, the bonus award system 20 could be utilized on lottery ticket machines to dispense bonus lottery tickets; with laundry machines that would issue credit for future usage; on self-service checkout machines to provide a monetary credit toward purchases for using the machine; phone card dispensing machines to add extra minutes to the phone card; with gum and candy vending machines to dispense extra candy or gum of the same kind that was purchased, or of a different kind that is being promoted; at car washes to award bonus features at the price of basic services; on coin changing machines to dispense additional coins as a bonus; on token dispensing machines to dispense additional tokens; novelty vending machines to dispense a bonus item; on arcade redemption machines to dispense bonus tickets redeemable toward a prize; at gasoline or fuel pumps to dispense free gasoline at the beginning of the pumping cycle; on video viewing machines to allow bonus additional viewing time; on soda vending machines to dispense an additional bottle of soda of the same brand purchase or of a special type that is being promoted; and on gaming machines to provide bonus credits toward the playing of the gaming machine. As can be seen from the extensive list set forth above, the potential use of the instant invention is substantial and limited only by imagination.

The bonus award system can be applied to essentially all types of vending machines. The bonus can be awarded prior to the selection of an item to be vended or after item selection. When awarded prior to item selection, the customer can be awarded a bonus expressed in monetary terms, or given a choice of dispensed bonus items. When the bonus is awarded after the selection of the item to be dispensed, the customer can be awarded an additional identical item to the one dispensed, given a choice of items, or provided a special bonus that is an item for which a promotional distribution is desired.

In one embodiment of the invention, the bonus award system 10 is encompassed and imprinted onto a printed circuit board 22 that incorporates the necessary electrical and electronic components to effect operation as described herein, as will be understood and appreciated by one of ordinary skill in the art. In one particular embodiment of the invention, the printed circuit board 22 is placed into an existing vending or gaming machine 10, 19 to convert the conventional vending or gaming machine 10, 19 into a bonus award machine as will b described in greater detail below.

As is best seen in FIG. 3, the printed circuit board 22 has incorporated thereon a pulse sensor 23, a microprocessor 25 or the equivalent, and a pulse emulator 24. The conventional money acceptor 12 is connected by electrical wiring 26, 27 to a pulse receiver or sensor 28 that is then operatively connected to the operating component 29 of the machine 10, 19. By connecting the printed circuit board 22 onto the wiring 26, 27, the bonus award apparatus 20 will sense the pulses from the money acceptor 12 corresponding to the amount of money received and award bonuses according to the principles set forth below. If the printed circuit board 22 is connected in parallel with the wiring 26, 27, the microprocessor 25 can award just the bonus through the pulse emulator 24 to be received by the pulse receiver 28. If, however, the printed circuit board 22 is placed in series between the money acceptor 12 and the pulse receiver 28, such as by removing the wiring components 26a, 27a, the microprocessor must be operable to duplicate the pulses received from the money acceptor in addition to the bonus pulses via the pulse emulator 24.

As best seen in the logic flow diagram of FIG. 4, the bonus award system 30 first establishes the intervals at which the bonuses are awarded at step 31. In the way of an example, for every 100 pulses received from the money acceptor 12, a bonus could awarded at pulse numbers 23, 38, 56, 82 and 100. Preferably, a seemingly random pattern of award points should be established to prevent, or at least minimize the likelihood of, someone anticipating the granting of a bonus award. In the alternative, the bonuses could be granted on a regular interval, such as every 20 pulses in the example given above. The award intervals are preferably established through the use of appropriate dip switches 53, 54, such as are depicted in FIG. 5, so that the intervals, whether they are fixed award points or a regular interval between award points, can be easily changed simply by accessing the dip switches and making appropriate adjustments. In the alternative, the microprocessor 25 can have the award points or the interval hard wired into the microprocessor, which would save on the cost of the apparatus 20, but allow for less flexibility.

Once the award points or intervals are established at step 31, the bonus award system 30 then resets the counter at step 32 to zero and starts to receive pulses at step 33 from the money acceptor 12. Each time a pulse is received from the money acceptor 12, the counter is incremented at step 34 and the counter is then compared to the established award set points at step 35. If the counter does not equal one of the established award set points, then the next pulse is received at step 33, the counter incremented at step 34 and the counter compared to the award set points at step 35 until the counter equals one of the set points. When the counter equals an established award set point, the award bonus is granted at step 36 and a corresponding pulse sent via the pulse emulator 24 to the pulse receiver 28. At step 37, the query as to whether the counter has reached the maximum established award set point, or some other appropriate value, so that the award set points can be re-established at step 31 and the counter reset at step 32.

The value of the award bonus can also be established by appropriate dip switches 54, such as is indicated in FIG. 5, so that the award bonus can be varied as the circumstances or desires would warrant. Therefore, not only can the award set points be changed or varied, but the award level can also be varied as desired by appropriate manipulation of the dip switches 53, 54.

As an example, assuming that a gaming machine 19 is provided with a bonus award apparatus 20 as is described above. The money acceptor 12 is configured to issue a pulse for each quarter (or 25 cents of money) inserted into the money acceptor 12. With the first award set point established at 23 (out of 100 pulses), the first 22 pulses would not generate a bonus award. However, assuming that the operator inserts a dollar bill into the money acceptor 12 at this point in time, the money acceptor 12 will issue four pulses that are received by the pulse sensor 23. The first one of those four pulses will trigger the bonus award, which (as an example) would have been set at one pulse, resulting in the operator receiving five credits for the play of the gaming machine 19. One skilled in the art will recognize that the award set point could be associated with different award bonus levels. Continuing with the example above, assuming that the operator continues to insert money into the gaming machine for additional plays of the machine 19, when the $38^{th}$ pulse (out of 100) pulse is received at the pulse sensor 23, the pulse emulator could award an additional three pulses as a bonus for the play of the gaming machine 19.

A block diagram of the award bonus apparatus 20 can best be seen in FIG. 5. The money acceptor 12 can be in one or more of the three forms depicted, including a coin acceptor 12a, a bill acceptor 12b, or a card acceptor 12c, which can arrange for the electronic transfer of money via a credit card, a debit card or a smart card. The pulse sensors 23 receive the appropriate pulses from the money acceptors 12a-12c and processes the received pulses through the microprocessor 25. When a bonus award is to be granted, the microprocessor 25 can actuate an optional audio annunciator 51 such as an external horn or buzzer and/or actuate an optional video annunciator 52, such as an LED or other light source. Also, an optional tally meter 56 can record the number of award bonuses that have been granted. The pulse emulators 24 transmit the appropriate pulses to the operating mechanism 29 of the machine 19 for the money inserted into the gaming machine 19 and/or the bonus pulses that have been awarded.

One skilled in the art will recognize that the above-described embodiment may not work with all types of vending machines 10. In most modern vending machines 10, the money acceptor 12 is associated with an escrow account to permit the vending machine to dispense change for the purchase made. In this arrangement, the bonus award system cannot simply count pulses transmitted from the money acceptor, as money received by the money acceptor 12 may not equal or even correlate to the financial utilization of the machine 10. For example, using the same award set points from the examples set forth above, if the counter had reached 10 pulses and the operator inserted a five ($5) dollar bill into the money acceptor 12 to purchase a twenty-five cent item for which he would receive $4.75 in change from the vending machine 10, merely sensing the 20 pulses from the $5 bill inserted into the money acceptor would grant the operator a bonus at the 23$^{rd}$ pulse when only the 11$^{th}$ pulse corresponded to the utilization of the vending machine.

Accordingly, the pulse sensor 23 would have to be configured to receive pulses from the vending portion of the vending machine 10. For example, the engagement of one of the buttons 14 to select an item to be vended from the machine 10, would signal a pulse to the vending portion of the machine 10 to cause the item to be dispensed. Connecting the pulse sensor 23 to that generated pulse, instead of the pulses corresponding to the amount of money received by the money acceptor 12 would be effective in operating the bonus award system 30. In the alternative, the apparatus 20 could include a sensor 17 that is mounted at the delivery bin 15 of the machine 10 and connected to the pulse sensor 23 to initiate the incremental increase of the counter at step 34. For vending machines 10 that dispense differently valued products, the pulse sensor 23 would have to be associated with the pulse corresponding to the dispensing of the product and the associated value assessed to the escrow account connected to the money acceptor 12.

An alternative embodiment of the bonus award system 40 can best be seen in FIGS. 6-6B. The first set of dip switches 53 are associated with the microprocessor 25 to indicated the value of the bonus award to be granted. For example, for a bank of five dip switches, if the first dip switch is set to the "on" position, the value of the bonus is at a predetermined value of, for example, the increment of 20 pulses. Similarly, each succeeding dip switch reflects an increase of 20 units (as an example) to the value of the bonus award. Thus, after starting the system at step 41, with the counter established at zero, the system searches through the dip switches 53 at step 42 to see which award level dip switch 53 has been set. If none of the award level dip switches have been activated, the error LED will blink to alert the operator or owner of the machine 19 that something is wrong with the bonus award system 40.

Once the award level is established at step 42, the microprocessor counts the pulses incoming into the apparatus 10 at step 43 until the first set point "P" has been reached. At this point, a slight delay is preferably built into the system to emphasize the granting of the award and then the bonus at the level of the award established with the first set of dip switches 53 is granted at step 44 to the customer operating the machine 19. The microprocessor then moves onto the next award set point and counts pulses at step 45 until the next award set point is reached. The award established at step 42 is then granted to the customer after an appropriate delay. The microprocessor moves on to each succeeding set point at steps 46-48 and counts pulses until the set point is reached and the bonus award is granted until the last set point is reached at step 48. After the award bonus is granted for the last bonus award set point, the system resets the counter to zero at step 49 before returning to the start position at step 41.

As noted above, the granting of the award bonus can be associated with an audio or visual annunciator 41, 42. Furthermore, the award set points for steps 43, 45, 46, 47 and 48 can be hard wired into the microprocessor 25 or variably established using a second set of dip switches 54. Also as noted above, for use with vending machines 10, the pulses counted may not necessarily come directly from the money acceptor 12, but from a pulse generator that is more indicative of the actual utilization of the vending machine 10.

The ability to insert the printed circuit board 22 into the existing electrical circuit of the vending machine 10 or, particularly, the gaming machine 19, enables the existing conventional machine 10, 19 to be converted into a bonus award granting machine that will encourage customers to use or play the machine 10, 19 because of the granting of the bonus awards in response to the mere utilization of the machine 10, 19. Associating the pulse sensors 23 with a generated pulse indicative of the utilization of the machine enables the printed circuit board 22 to be utilized in substantially every vending and gaming machine in the marketplace.

One of ordinary skill in the art will readily recognize that the bonus award system incorporating the principles of the instant invention could be integrally incorporated into the money-operated gaming or vending machine 10, 19, instead of in the form of a separate module 22. In such an embodiment of the instant invention, the bonus award system could be incorporated into the money acceptor 12, into the escrow account to cooperate with the electronic pulse indicating the dispensing of a product, or into the operating mechanism that receives the electronic pulse indicating that product is to be dispensed. By awarding bonuses in an apparent or actual random pattern, the utilization of the machine 10, 19 should be enhanced.

Since human nature is exploited to encourage the use of the bonus award enhanced machine, instead of the adjacent conventional machine, the instant invention increases the marketability of the machines 10, 19. Even though free product or credits are issued as award bonuses, the volume of the profit realized through the use of the machine will be increased because of the increased utilization of the machine.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In a money-operated vending machine having a money acceptor operable to receive money in exchange for operation of the machine, said money acceptor being operatively connected to an operating mechanism of said machine providing an expected normal output of a non-monetary product from said machine in response to an insertion of a pre-determined amount of money into the money acceptor, such that said money acceptor generates an electronic pulse to indicate the utilization of the machine, the improvement comprising:

a detachable bonus award module operatively connected to said operating mechanism to receive said electronic pulse from said money acceptor and dispense periodic bonus awards of said normal non-monetary product in response to the utilization of said vending machine according to predetermined criteria established in said bonus award module, said bonus awards being dispensed with and in addition to said expected normal output in the same configuration as said expected normal output.

2. The money-operated vending machine of claim 1 wherein said bonus award module is connected parallel to said money acceptor, said bonus award module being operable to sense the electronic pulses corresponding to the utilization of the machine and to generate bonus electronic pulses when said predetermined criteria are met.

3. The money-operated vending machine of claim 1 wherein said bonus award module is connected in series with said money acceptor so that said bonus award module receives said electronic pulses corresponding to the utilization of said vending machine and re-generates said electronic pulses to be transmitted to said operating mechanism with bonus electronic pulses being added to said re-generated electronic pulses when said predetermined criteria are met.

4. The money-operated vending machine of claim 1 wherein said bonus award module comprises:
- a pulse sensor to receive said electronic pulses generated in response to the utilization of said vending machine;
- a microprocessor to compare the utilization of said vending machine to said predetermined criteria and determine when bonus awards should be granted; and
- a pulse emulator to generate electronic pulses corresponding to said bonus awards to be received by said operating mechanism.

5. The money-operated vending machine of claim 4 wherein said bonus award module further comprises a set of dip switches to input said predetermined criteria into said microprocessor.

6. The money-operated vending machine of claim 5 wherein said bonus award module further comprises a second set of dip switches to input a value for said bonus award, whereby the number of bonus award pulses to be generated when said predetermined criteria is met can be varied.

7. The money-operated vending machine of claim 4 wherein said microprocessor initiates an annunciator to provide an indicator that a bonus award has been granted to the operator of the vending machine.

8. The money-operated vending machine of claim 4 wherein said predetermined criteria includes multiple set points within said predetermined series of said electronic pulses indicating utilization of said vending machine.

9. The money-operated vending machine of claim 8 wherein said multiple set points are irregularly spaced within said predetermined series of said electronic pulses indicating utilization of said vending machine.

10. A bonus award module for utilization in a previously existing money-operated vending machine to award a periodic bonus non-monetary product in response to utilization of said machine, said money-operated machine including a money acceptor that generates electronic pulses indicating utilization of said machine and an operating mechanism operatively connected to said money acceptor to receive said electronic pulses and effect operation of said machine to provide an expected normal non-monetary output therefrom in response to an insertion of a predetermined amount of money into said money acceptor, comprising:
- a pulse sensor to sense said electronic pulses generated in response to the utilization of said machine;
- a microprocessor to compare the utilization of said machine to predetermined criteria and determine when bonus awards should be granted; and
- a pulse emulator to generate electronic pulses corresponding to said bonus awards of said normal non-monetary output to be received by said operating mechanism, said bonus awards being dispensed by said machine in addition to said expected normal non-monetary output in the same configuration as said expected normal non-monetary output.

11. The bonus award module of claim 10 wherein said bonus award module is connected in series with said money acceptor so that said bonus award module receives said electronic pulses corresponding to the utilization of said machine and re-generates said electronic pulses to be transmitted to said operating mechanism with bonus electronic pulses being added to said re-generated electronic pulses when said predetermined criteria are met.

12. The bonus award module of claim 10 wherein said predetermined criteria is an established set point within a predetermined series of said electronic pulses indicating utilization of said machine.

13. The bonus award module of claim 12 wherein said predetermined criteria includes multiple set points irregularly spaced within said predetermined series of said electronic pulses indicating utilization of said machine.

14. The bonus award module of claim 13 further comprising a set of dip switches to input said multiple set points into said microprocessor.

15. A bonus award system for utilization in a previously existing money-operated vending machine including a money acceptor that generates electronic pulses indicating utilization of said machine and an operating mechanism operatively connected to said money acceptor to receive said electronic pulses and effect operation of said machine to provide an expected normal non-monetary product from the operation of the machine in response to placing a predetermined amount of money into said money acceptor, comprising the steps of:
- establishing a predetermined criteria for awarding bonuses in response to the utilization of said machine;
- sensing electronic pulses indicative of the utilization of said machine;
- comparing said electronic pulses indicative of the utilization of said machine to said predetermined criteria by a microprocessor; and
- awarding a bonus electronic pulse to be received by said operating mechanism to provide a periodic bonus award in the form of an additional increment of said normal non-monetary product of the machine in response to the utilization of said machine when said predetermined criteria is met, said bonus award being dispensed with said expected normal non-monetary product in the same configuration as said expected normal non-monetary product.

16. The bonus award system of claim 15 wherein said establishing step includes the step of selecting award set points within a predetermined series of said electronic pulses indicative of the utilization of said machine through manipulation of dip switches operatively connected to said microprocessor.

17. The bonus award system of claim 16 wherein said step of awarding a bonus electronic pulse results in a bonus award of an output being dispensed by said money-operated machine in addition to a normal output from the operation of said money-operated machine.

* * * * *